S. L. MENGE.
ROTARY PUMP.
APPLICATION FILED JUNE 24, 1909.

950,398. Patented Feb. 22, 1910.

Witnesses
Geo. H. Bynue
Katharine F. Byrn

Inventor
S. L. Menge,
by Wilkinson, Fisher & Witherspoon,
Attorneys.

ically closed to prevent settling in
UNITED STATES PATENT OFFICE.

SIDNEY LAURENCE MENGE, OF NEW ORLEANS, LOUISIANA.

ROTARY PUMP.

950,398.  Specification of Letters Patent.  Patented Feb. 22, 1910.

Application filed June 24, 1909. Serial No. 504,141.

*To all whom it may concern:*

Be it known that I, SIDNEY LAURENCE MENGE, a citizen of the United States, residing at New Orleans, in the parish of Orleans and State of Louisiana, have invented certain new and useful Improvements in Rotary Pumps; and I do hereby declare the following to be a full, clear, and exact description of the invention, such as will enable others skilled in the art to which it appertains to make and use the same.

My invention relates to improvements in rotary pumps, and is especially intended to cover certain improvements upon the reissued patent to Joseph Menge, No. 11,214, reissued December 29, 1891.

My invention will be understood by reference to the accompanying drawings, in which the same parts are indicated by the same characters throughout the several views.

Figure 1:
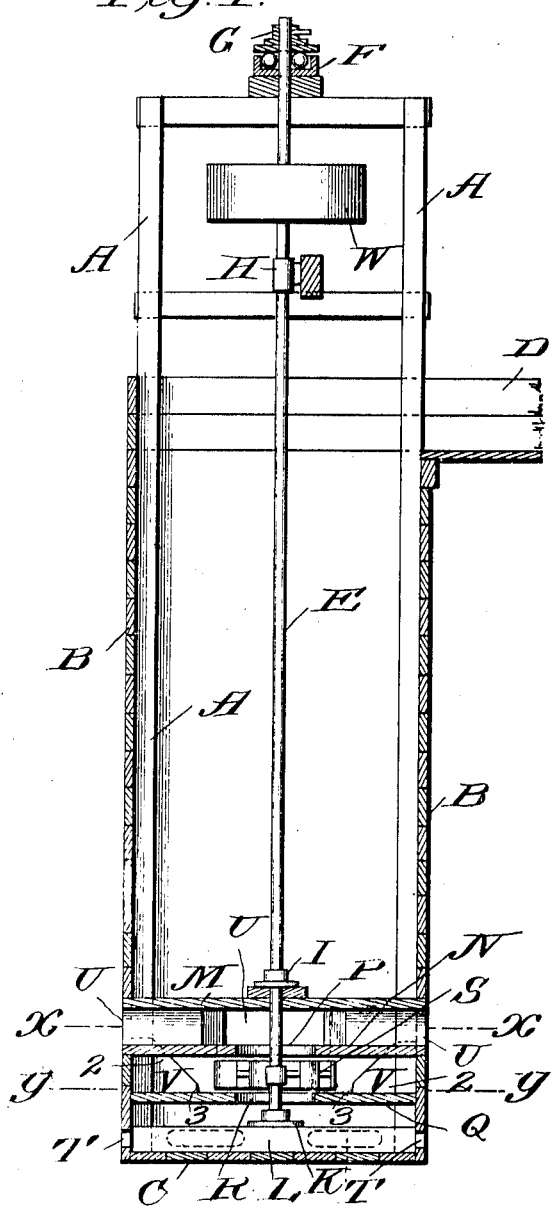
Figure 2:
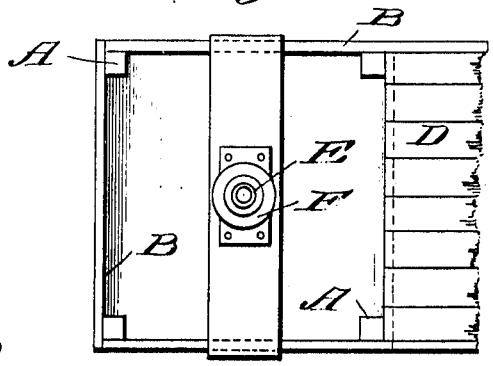
Figure 3:
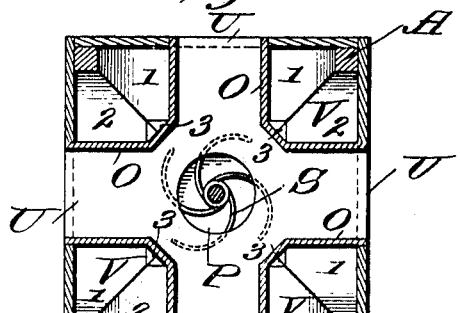
Figure 4:
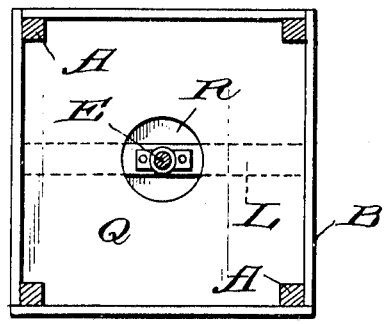
Figure 5:
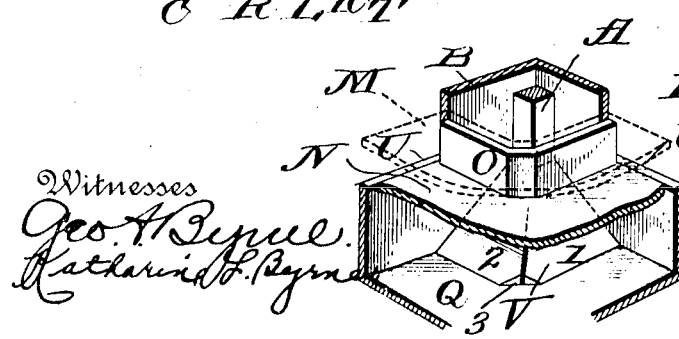

Figure 1 shows a rotary piston mounted in a wooden pump box, and shows a vertical section through the box and chute, parts being broken away. Fig. 2 is a plan view showing the chute broken away. Fig. 3 shows a section along the line X—X of Fig. 1, and looking down. Fig. 4 shows a section along the line Y—Y of Fig. 1, and looking down. Fig. 5 is a perspective view showing one of the corners of the pump box, parts being broken away and parts being shown in dotted lines.

The form of pump box shown is rectangular, and consists of planking B, secured to the four corner posts A. The bottom C is preferably closed to prevent settling in the mud, and a plurality of openings T are provided in the sides of the pump box, above the bottom C.

D represents the chute for carrying off the water.

E represents a vertical shaft, having a set collar G near its upper end, which collar rests on the ball bearing F, and supports the weight of the shaft and parts carried thereby.

H and I represent bearings for the vertical shaft, and S represents the pump wheel carried by said shaft, which is preferably in the form of a series of curved blades, as shown in plan in Fig. 2.

K represents the step bearing for the vertical shaft, but serves only as a lateral guide, the weight of the shaft being taken on the ball bearing F.

L represents a beam which serves as a support for the step K.

The wheel S is mounted in a chamber located between the partitions N and Q, and each of the partitions has an opening P and R concentric with the wheel, as shown in Figs. 1, 3 and 4. Below the partition Q there are inlets T in the side of the box, and above the partition N there is a cruciform inlet chamber having four openings U, one at each side of the box, and above this cruciform chamber is the solid partition M, shown in Fig. 1, and in dotted lines in Fig. 5. At each corner of this cruciform chamber there is a vertical passage shut in by the partitions O, for the flow of water upward from the wheel, and at the bottom of this passage a deflector V is provided which consists of two boards 1 and 2 set at an angle, as shown in Fig. 5, and preferably cut away slightly, as at 3 in said figure. These deflectors V serve to direct the water up into the vertical passage at the four corners of the pump box, and the water so deflected rises above the partition M into the upper portion of the pump box where it overflows from the trough D.

W represents a pulley driven by a belt, not shown, but any other suitable means for driving the pump may be used, if desired.

The operation of the device is as follows:—The pump is submerged, so that the inner bottom M is always covered with water, and the water may extend to any height above this inner bottom, as far as the chute D. The rotation of the pulley W will cause the wheel S to throw the water outward, causing it to rise in the pump box, and finally flow out at the chute D. The shape of the inclines V facilitates the rising of the water in the pump box. By having considerable clearance space between the top and bottom of the wheel and the perforated partitions Q and N, the water is free to be thrown outward with very small compressive strains thereon and very little skin friction, the water thrown outward causing a partial vacuum into which inrushing water enters, and is in its turn displaced. By having the water enter above and below the wheel, the pressure is practically balanced, and greater efficiency is secured. By having the vertical shaft hung on ball bearings at the head thereof, the grit which is always found in drainage water does not wear away the bottom of the shaft too rapidly, and any wear on the bottom of the shaft may be compensated for by adjusting the set collar G.

It will be noted that the suction box, being of cruciform shape, admits the water from four directions toward the center of the wheel, and the construction of this box also serves as a double brace to the bottom of the pump box where the stiffening is most needed. The four V-shaped double inclines in the corners of the box not only serve to stiffen the said corners during the vibrations to which an apparatus of this character is necessarily subjected, but also serve to take up the space which would otherwise be filled with dead water or with eddy currents interfering with the efficient action of the wheel.

It will be noted that there are no valves to be taken care of, or to get out of order, that the pump is extremely simple in construction, and there is sufficient clearance to take care of mud, grit, and such sticks or other debris that may be drawn through the pump, and thus the pump is not liable to clog up and get out of order, either from continuous use, or from neglect.

It will be obvious that the pump may be made of metal if desired, and the form of the cross section may be varied at will, but I prefer to have the pump box square in cross section and to make it of wood, as shown.

Having thus described my invention, what I claim and desire to secure by Letters Patent of the United States, is—

1. A rotary pump of the character described, comprising a pump box with a perforated inner bottom, a pumping wheel mounted above said inner bottom, and a cruciform suction box mounted above said pumping wheel, with an opening in the center of the bottom of said suction box, and with V-shaped double inclines in the form of a corner of a pyramid located in the corners of the pump box between the sides of the suction box, substantially as described.

2. A rotary pump of the character described, comprising a pump box with a perforated inner bottom, a pumping wheel mounted above said inner bottom, a cruciform suction box mounted above said pumping wheel, with an opening in the center of the bottom of said suction box, and with V-shaped double inclines in the form of a corner of a pyramid mounted in the corners of the pump box between the sides of the suction box, a ball bearing mounted at the head of the pump box above the water, and a set collar adjustably connected to the vertical shaft and suspending the weight thereof on the said ball bearing, substantially as described.

In testimony whereof, I affix my signature, in presence of two witnesses.

SIDNEY LAURENCE MENGE.

Witnesses:
EDWARD M. RUBBERT,
SCOTT E. BEER.